(12) United States Patent
Zhao et al.

(10) Patent No.: US 11,949,898 B2
(45) Date of Patent: *Apr. 2, 2024

(54) DELTA ANGLE SIGNALING METHOD FOR LUMA BLOCKS

(71) Applicant: TENCENT AMERICA LLC, Palo Alto, CA (US)

(72) Inventors: Liang Zhao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,033

(22) Filed: Oct. 14, 2022

(65) Prior Publication Data

US 2023/0051558 A1    Feb. 16, 2023

Related U.S. Application Data

(63) Continuation of application No. 17/390,256, filed on Jul. 30, 2021, now Pat. No. 11,546,625.

(Continued)

(51) Int. Cl.
*H04N 19/00* (2014.01)
*H04N 19/105* (2014.01)
(Continued)

(52) U.S. Cl.
CPC .......... *H04N 19/46* (2014.11); *H04N 19/105* (2014.11); *H04N 19/159* (2014.11); *H04N 19/176* (2014.11)

(58) Field of Classification Search
CPC ..................................................... H04N 19/00
See application file for complete search history.

(56) References Cited

U.S. PATENT DOCUMENTS

2019/0124339 A1* 4/2019 Young ................. H04N 19/159
2020/0021814 A1* 1/2020 Xu ......................... H04N 19/52

FOREIGN PATENT DOCUMENTS

EP    3 301 916 A1    4/2018

OTHER PUBLICATIONS

B. Bross et al., "General Video Coding Technology in Responses to the Joint Call for Proposals on Video Compression with Capability beyond HEVC," in IEEE Transactions on Circuits and Systems for Video Technology, 2019, pp. 1-16, (16 pages total).

(Continued)

*Primary Examiner* — Maryam A Nasri
(74) *Attorney, Agent, or Firm* — Sughrue Mion, PLLC

(57) ABSTRACT

Systems and methods for improved delta angle signaling for blocks in video compression are provided. A method includes encoding a bitstream that includes a picture. The encoding includes obtaining a nominal angle of a current block of the picture for intra prediction; obtaining a nominal angle of at least one neighboring block of the current block for intra prediction; determining whether to signal all allowed delta angles of the nominal angle of the current block, or only a subset of the allowed delta angles of the nominal angle of the current block, based on a comparison between the nominal angle of the current block and the nominal angle of the at least one neighboring block; and signaling, within the bitstream, all the allowed delta angles or the subset of the allowed delta angles of the nominal angle of the current block based on the determining.

20 Claims, 14 Drawing Sheets

Related U.S. Application Data

(60) Provisional application No. 63/067,791, filed on Aug. 19, 2020.

(51) Int. Cl.
*H04N 19/159* (2014.01)
*H04N 19/176* (2014.01)
*H04N 19/46* (2014.01)

(56) References Cited

OTHER PUBLICATIONS

Bross et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0283-v2 (7 pages total).
Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001-v6 (141 pages total).
Bross et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2001-VE (455 pages total).
International Search Report dated Dec. 9, 2021 in International Application No. PCT/US2021/046472.
L. Zhao et al., "Wide Angular Intra Prediction for Versatile Video Coding," 2019 Data Compression Conference (DCC), Snowbird, UT, USA, 2019, pp. 53-62 (10 pages total).
P. de Rivaz, et al., "AV1 Bitstream & Decoding Process Specification", Version 1.0.0 with Errata 1, Jan. 8, 2019 (681 pages total).
Racape et al., "CE3-related: Wide-angle intra prediction for non-square blocks", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0500_r4 (16 pages total).
Written Opinion of the International Searching Authority dated Dec. 9, 2021 in International Application No. PCT/US2021/046472.
X. Zhao et al., "Coupled Primary and Secondary Transform for Next Generation Video Coding," 2018 IEEE Visual Communications and Image Processing (VCIP), Taichung, Taiwan, 2018, pp. 1-4 (4 pages total).
X. Zhao et al., "Low-Complexity Intra Prediction Refinements for Video Coding," 2018 Picture Coding Symposium (PCS), San Francisco, CA, 2018, pp. 139-143 (5 pages total).
X. Zhao et al., "NSST: Non-Separable Secondary Transforms for Next Generation Video Coding", 2016 IEEE (5 pages total).
X. Zhao et al., "Joint separable and non-separable transforms for next-generation video coding," IEEE Transactions on Image Processing, vol. 27, No. 5, pp. 1-13, May 2018 (13 pages total).
X. Zhao et al., "Novel Statistical Modeling, Analysis and Implementation of Rate-Distortion Estimation for H.264/AVC Coders," in IEEE Transactions on Circuits and Systems for Video Technology, vol. 20, No. 5, pp. 647-660, May 2010 (14 pages total).
Y.-J. Chang et al., "Intra prediction using multiple reference lines for the versatile video coding standard," Proc. SPIE 11137, Applications of Digital Image Processing XLII, 1113716, Sep. 2019 (8 pages total).
Z. Zhang et al., "Fast Adaptive Multiple Transform for Versatile Video Coding," 2019 Data Compression Conference (DCC), Snowbird, UT, USA, 2019, pp. 63-72 (10 pages total).
Z. Zhang et al., "Fast DST-7/DCT-8 with Dual Implementation Support for Versatile Video Coding," in IEEE Transactions on Circuits and Systems for Video Technology, 2020, pp. 1-17 (17 pages total).
Zhao et al., "CE3-related: Unified MPM list based on CE3-3.3 and CE3-3.5.1", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0394-r2 (25 pages total).
Zhao et al., "CE6: Fast DST-7/DCT-8 with dual implementation support (Test 6.2.3)" Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0497 (11 pages total).
Zhao et al., "CE6: On 8-bit primary transform core (Test 6.1.3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0285-r1 (18 pages total).
Zhao et al., "CE6-related: Unified LFNST using block size independent kernel", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0539-v2 (19 pages total).
Zhao et al., "Non-CE6: Configurable max transform size in VVC", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0545-v2 (6 pages total).
Extended European Search Report dated Nov. 3, 2022 in European Application No. 21859040.4.

* cited by examiner

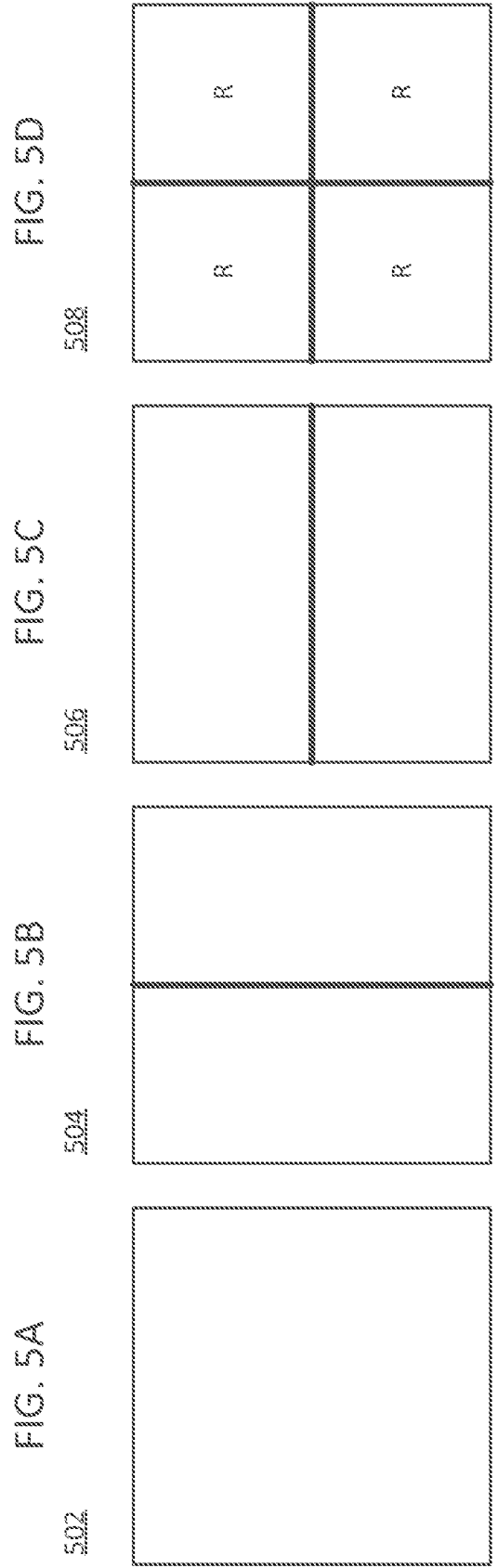

511

512

513

514

515

516

517

518

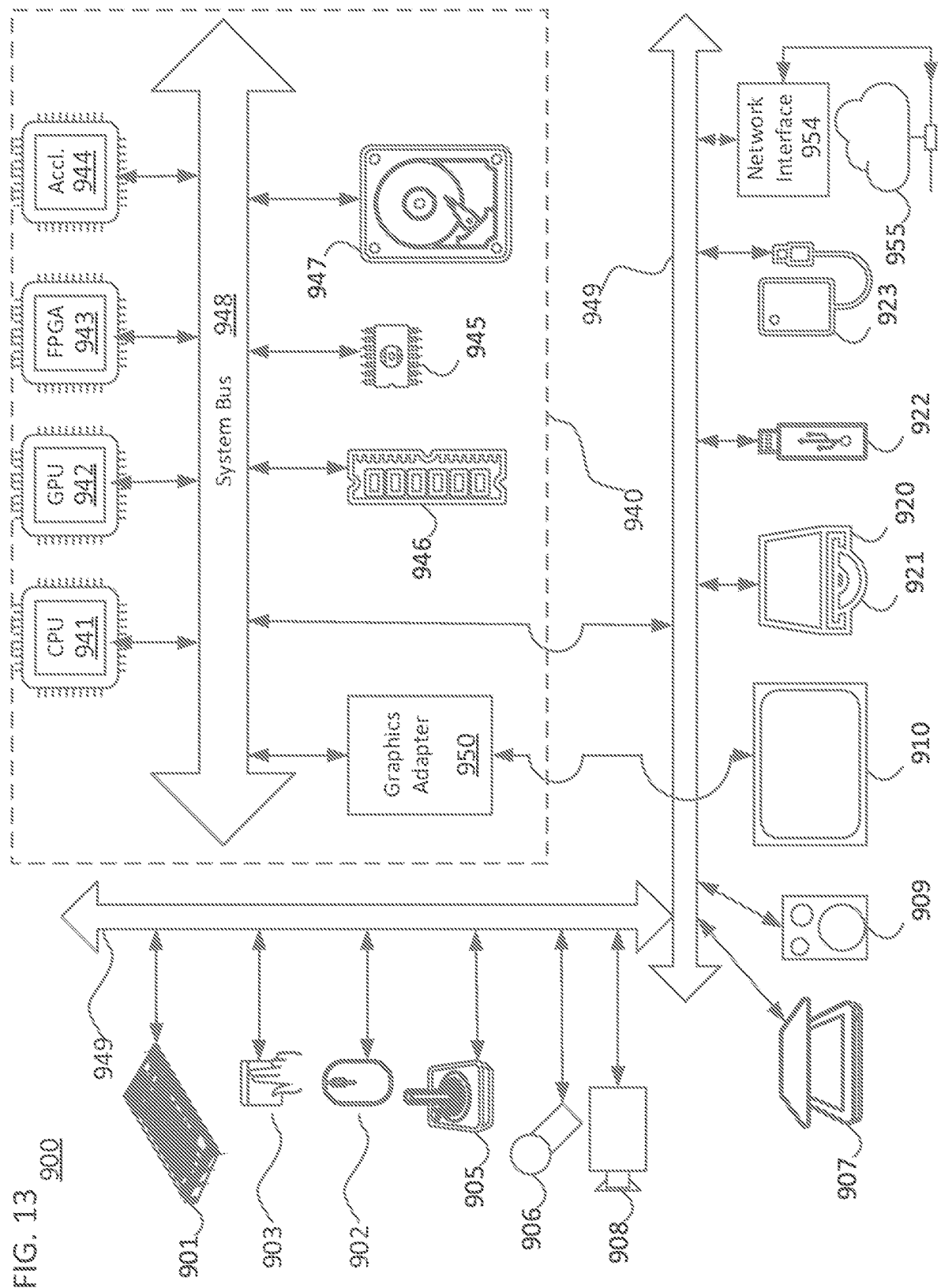

DELTA ANGLE SIGNALING METHOD FOR LUMA BLOCKS

CROSS-REFERENCE TO THE RELATED APPLICATIONS

This application is a continuation of U.S. application Ser. No. 17/390,256, filed on Jul. 30, 2021, which claims priority from U.S. Provisional Application No. 63/067,791, filed on Aug. 19, 2020, the disclosures of which are incorporated herein by reference in their entireties.

FIELD

Embodiments of the present disclosure relate to a set of advanced video coding technologies and, more particularly, improved delta angle signaling for luma blocks in video compression.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies, and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The "AV1 Bitstream & Decoding Process Specification" (Version 1.0.0 with Errata 1), The Alliance for Open Media (Jan. 8, 2019), is incorporated herein in its entirety by reference.

SUMMARY

According to one or more embodiments, a method performed by at least one processor is provided. The method includes encoding a bitstream that includes a picture. The encoding includes obtaining a nominal angle of a current block of the picture for intra prediction; obtaining a nominal angle of at least one neighboring block of the current block for intra prediction; determining whether to signal all allowed delta angles of the nominal angle of the current block, or only a subset of the allowed delta angles of the nominal angle of the current block, based on a comparison between the nominal angle of the current block and the nominal angle of the at least one neighboring block; and signaling, within the bitstream, all the allowed delta angles or the subset of the allowed delta angles of the nominal angle of the current block based on the determining. The method further includes outputting the bitstream that is encoded.

According to an embodiment, the determining includes determining to signal all the allowed delta angles of the nominal angle of the current block based on an absolute difference between a value corresponding to the nominal angle of the current block and a value corresponding to the nominal angle of the at least one neighboring block being less than or equal to a threshold value.

According to an embodiment, the threshold value is 2.

According to an embodiment, the determining including determining to signal only the subset of the allowed delta angles of the nominal angle of the current block based on an absolute difference between a value corresponding to the nominal angle of the current block and a value corresponding to the nominal angle of the at least one neighboring block being greater than a threshold value.

According to an embodiment, a number of the allowed delta angles in the subset that are determined to be signaled is based on the absolute difference between the value corresponding to the nominal angle of the current block and the value corresponding to the nominal angle of the at least one neighboring block.

According to an embodiment, the comparison is between the nominal angle of the current block and the nominal angle of only a predetermined number of neighboring blocks.

According to an embodiment, the signaling includes signaling at least one of the allowed delta angles by using a cumulative density function (CDF), based on the determining.

According to an embodiment, the method further includes signaling an index within the bitstream based on a mapping table in which the index is mapped to a delta angle of the current block.

According to an embodiment, the index is mapped, in the mapping table, to the delta angle of the current block and a delta angle of the at least one neighboring block.

According to an embodiment, the current block is a luma block.

According to one or more embodiments, a system includes: at least one memory configured to store computer program code; and at least one processor configured to access the computer program code and operate as instructed by the computer program code. The computer program code includes encoding code configured to cause the at least one processor to encode a bitstream that includes a picture. The encoding code includes: first obtaining code configured to cause the at least one processor to obtain a nominal angle of a current block of the picture for intra prediction; second obtaining code configured to cause the at least one processor to obtain a nominal angle of at least one neighboring block of the current block for intra prediction; determining code configured to cause the at least one processor to determine whether to signal all allowed delta angles of the nominal angle of the current block, or only a subset of the allowed delta angles of the nominal angle of the current block, based on a comparison between the nominal angle of the current block and the nominal angle of the at least one neighboring block; and signaling code configured to cause the at least one processor to signal, within the bitstream, all the allowed delta angles or the subset of the allowed delta angles of the nominal angle of the current block based on the determining. The computer program code further includes outputting code configured to cause the at least one processor to output the bitstream that is encoded.

According to an embodiment, the determining code is configured to cause the at least one processor to determine to signal all the allowed delta angles of the nominal angle of the current block based on an absolute difference between a value corresponding to the nominal angle of the current block and a value corresponding to the nominal angle of the at least one neighboring block being less than or equal to a threshold value.

According to an embodiment, the threshold value is 2.

According to an embodiment, the determining code is configured to cause the at least one processor to determine to signal only the subset of the allowed delta angles of the nominal angle of the current block based on an absolute difference between a value corresponding to the nominal angle of the current block and a value corresponding to the nominal angle of the at least one neighboring block being greater than a threshold value.

According to an embodiment, a number of the allowed delta angles in the subset that are determined to be signaled is based on the absolute difference between the value corresponding to the nominal angle of the current block and the value corresponding to the nominal angle of the at least one neighboring block.

According to an embodiment, the comparison is between the nominal angle of the current block and the nominal angle of only a predetermined number of neighboring blocks.

According to an embodiment, the signaling code is configured to cause the at least one processor to signal at least one of the allowed delta angles by using a cumulative density function (CDF), based on the determining.

According to an embodiment, the encoding code further includes index signaling code that is configured to cause the at least one processor to signal an index based on a mapping table in which the index is mapped to a delta angle of the current block.

According to an embodiment, the index is mapped, in the mapping table, to the delta angle of the current block and a delta angle of the at least one neighboring block.

According to one or more embodiments, a non-transitory computer-readable medium storing computer instructions is provided. The computer instructions are configured to, when executed by at least one processor, cause the at least one processor to encode a bitstream that includes a picture by: obtaining a nominal angle of a current block of the picture for intra prediction; obtaining a nominal angle of at least one neighboring block of the current block for intra prediction; determining whether to signal all allowed delta angles of the nominal angle of the current block, or only a subset of the allowed delta angles of the nominal angle of the current block, based on a comparison between the nominal angle of the current block and the nominal angle of the at least one neighboring block; and signaling, within the bitstream, all the allowed delta angles or the subset of the allowed delta angles of the nominal angle of the current block based on the determining. The computer instructions are further configured to, when executed by the at least one processor, cause the at least one processor to output the bitstream that is encoded.

BRIEF DESCRIPTION OF THE DRAWINGS

Further features, the nature, and various advantages of the disclosed subject matter will be more apparent from the following detailed description and the accompanying drawings in which:

FIG. 5A a diagram illustrating a first example partition structure of VP9.

FIG. 5B a diagram illustrating a second example partition structure of VP9.

FIG. 5C a diagram illustrating a third example partition structure of VP9.

FIG. 5D a diagram illustrating a fourth example partition structure of VP9.

FIG. 13 is a diagram of a computer system suitable for implementing embodiments of the present disclosure.

DETAILED DESCRIPTION

Figure 1:
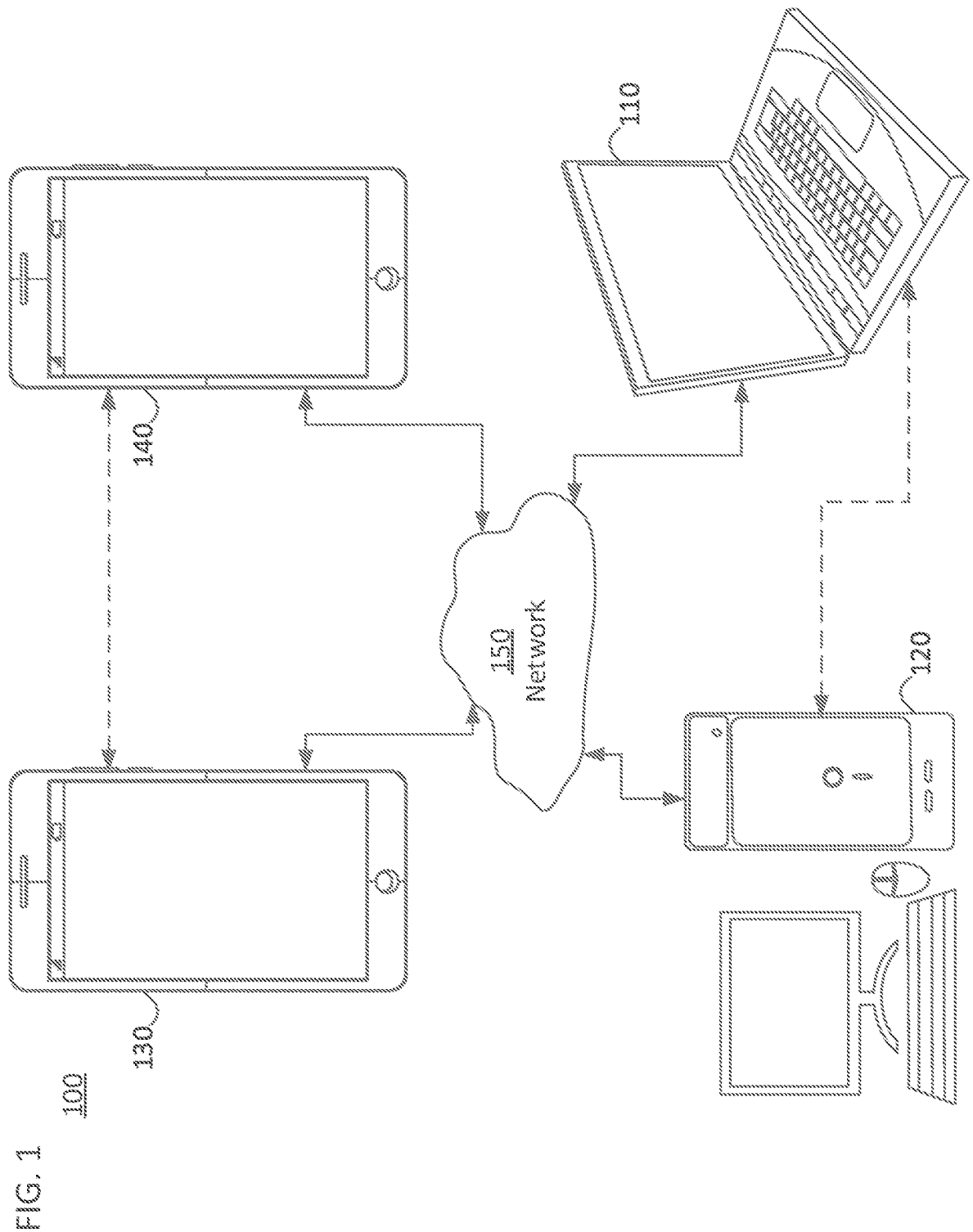
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
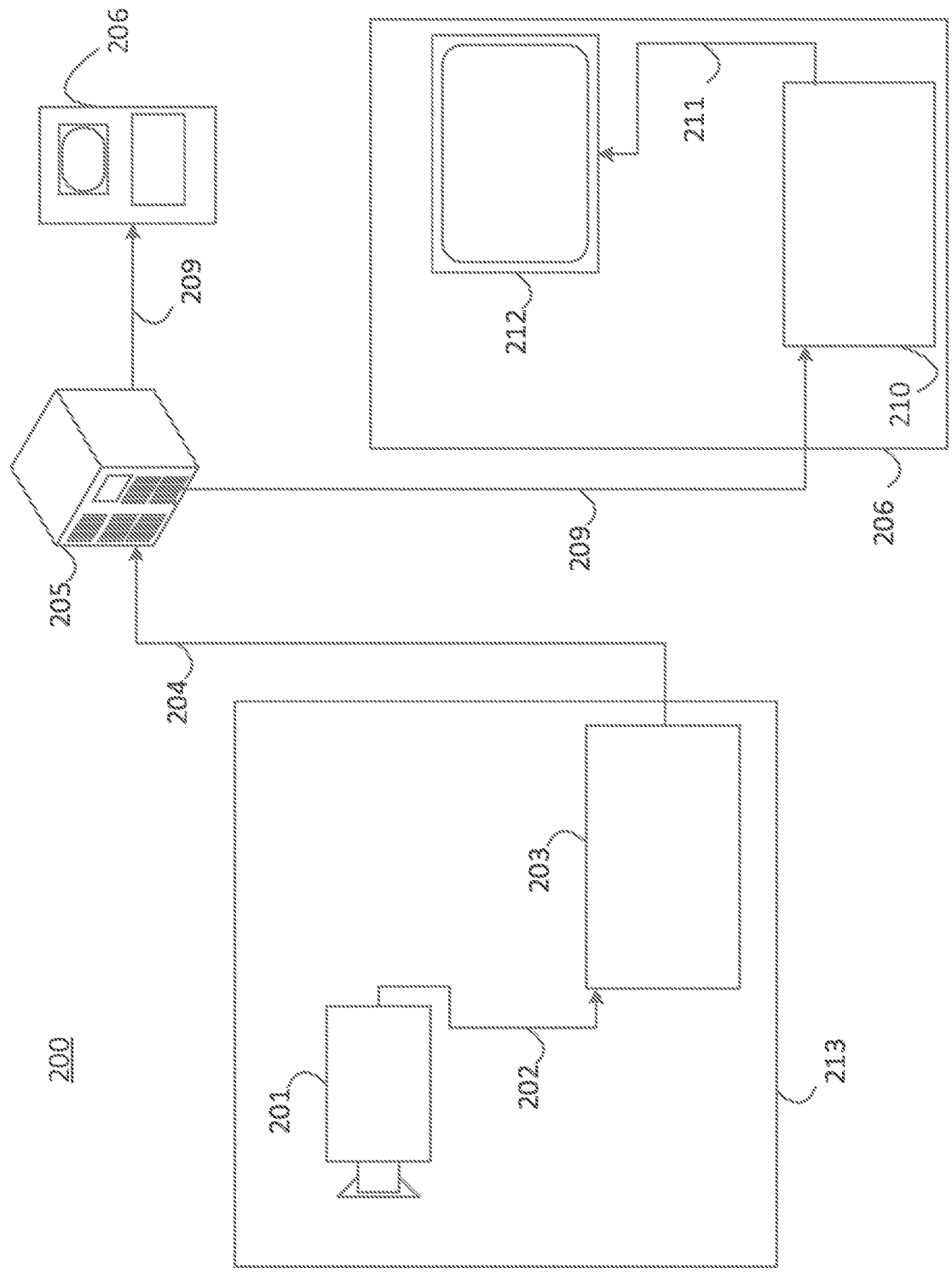
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
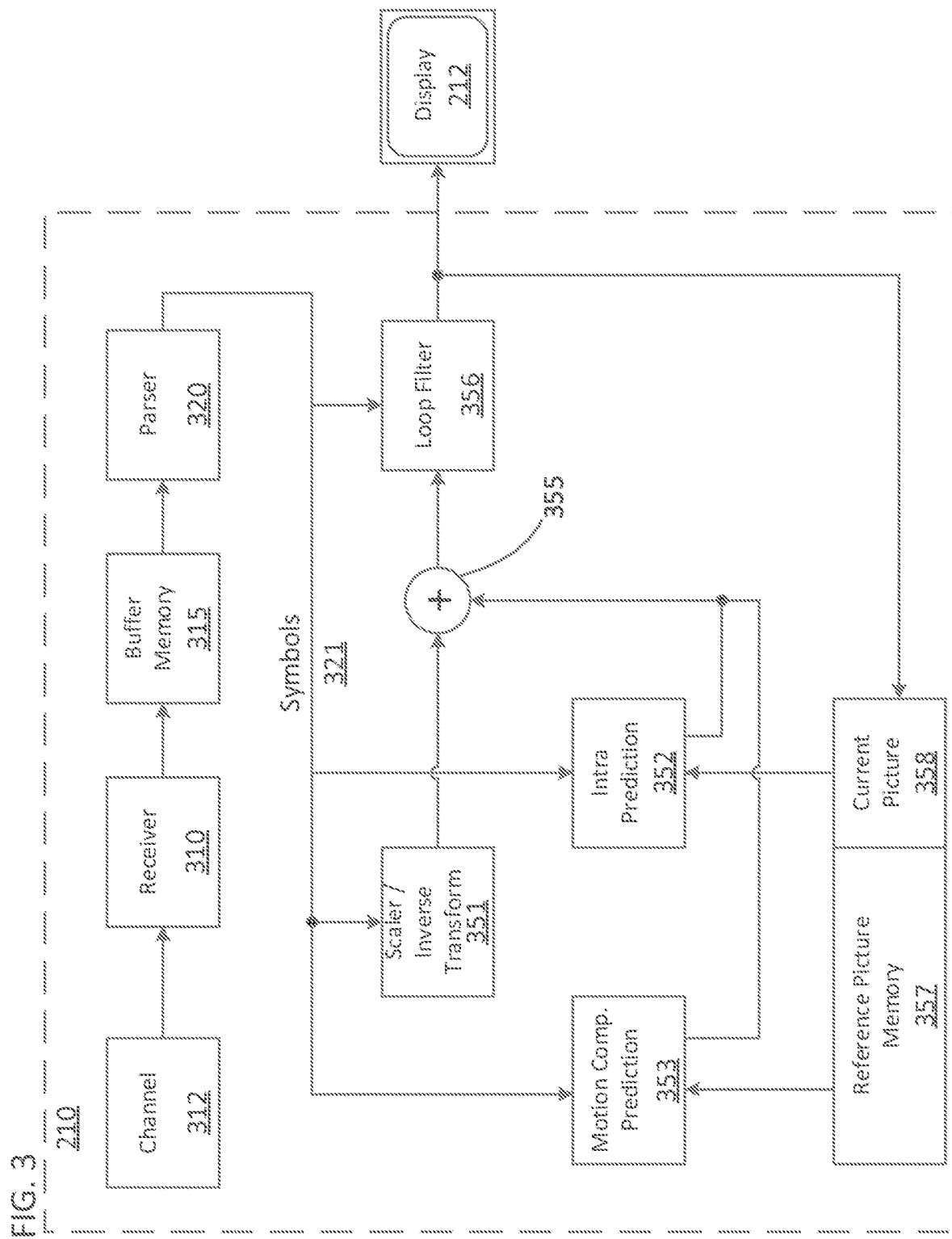
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
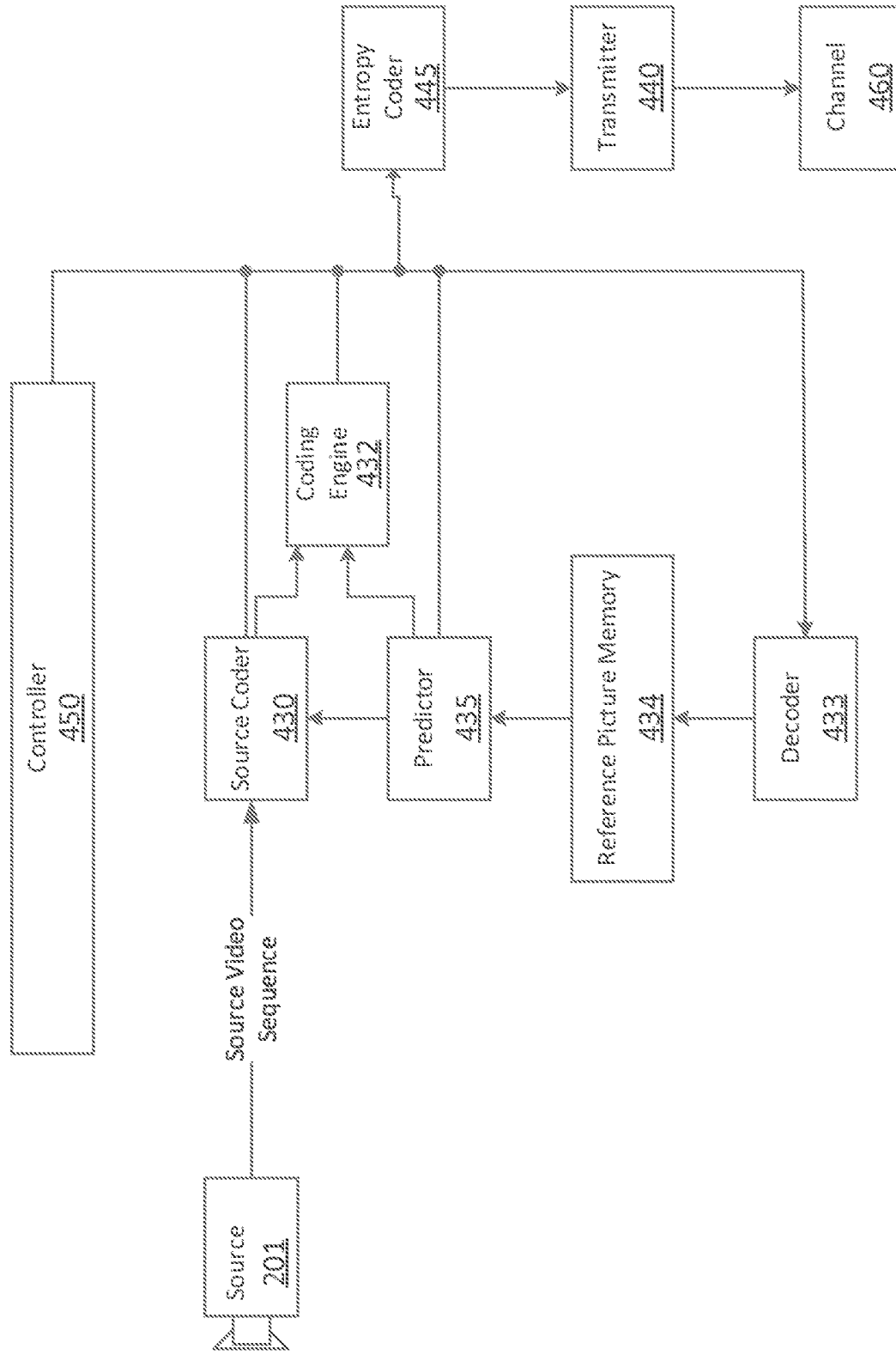
FIG. 4 is a schematic illustration of a simplified block diagram of an encoder in accordance with an embodiment.
Figure 6A:
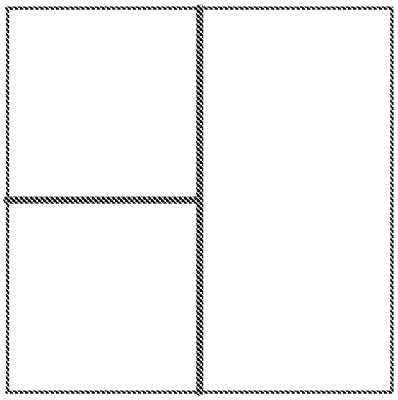
FIG. 6A a diagram illustrating a first example partition structure of AV1.
Figure 6B:
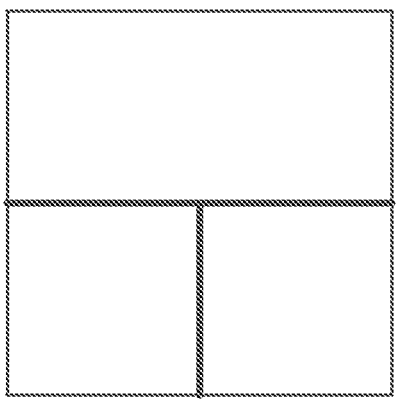
FIG. 6B a diagram illustrating a second example partition structure of AV1.
Figure 6C:
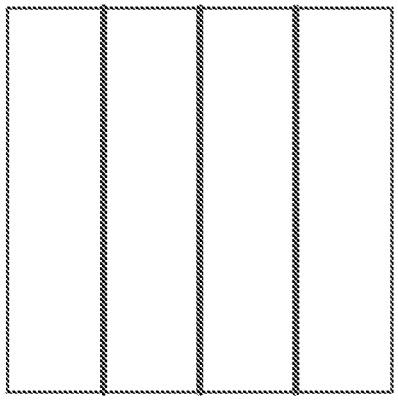
FIG. 6C a diagram illustrating a third example partition structure of AV1.
Figure 6D:
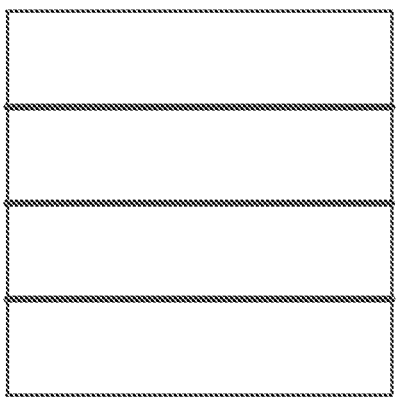
FIG. 6D a diagram illustrating a fourth example partition structure of AV1.
Figure 6E:
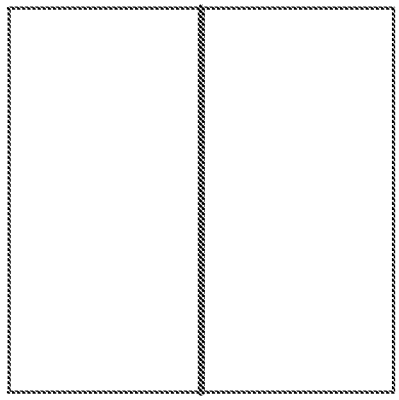
FIG. 6E a diagram illustrating a fifth example partition structure of AV1.
Figure 6F:
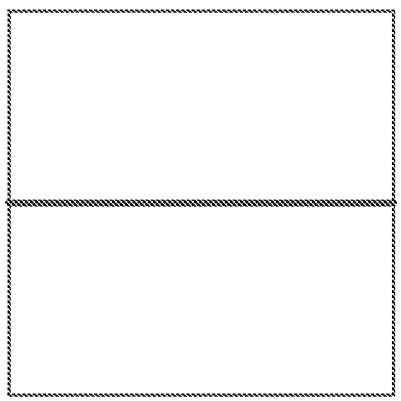
FIG. 6F a diagram illustrating a sixth example partition structure of AV1.
Figure 6G:
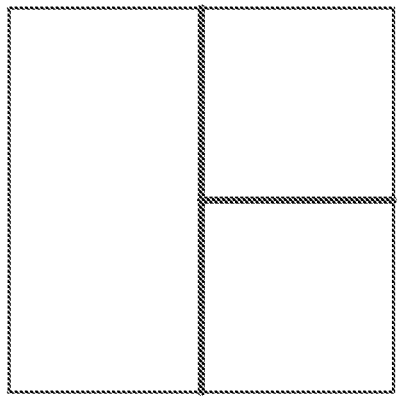
FIG. 6G a diagram illustrating a seventh example partition structure of AV1.
Figure 6H:
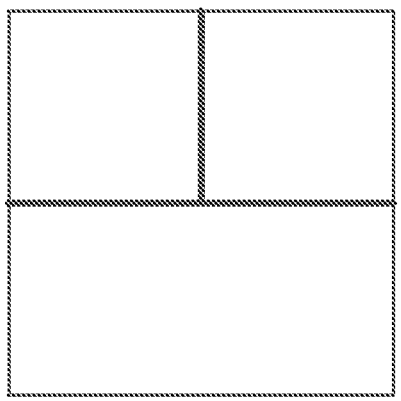
FIG. 6H a diagram illustrating an eighth example partition structure of AV1.
Figure 6J:
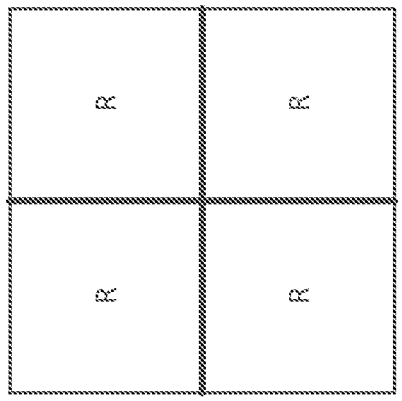
FIG. 6J a diagram illustrating a tenth example partition structure of AV1.
Figure 6I:
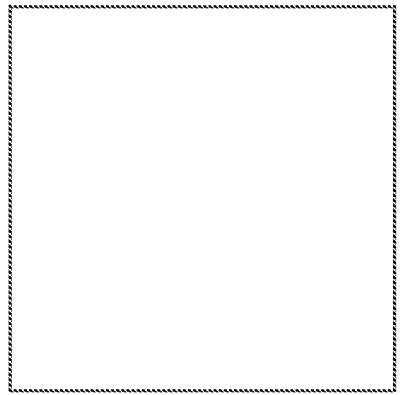
FIG. 6I a diagram illustrating a ninth example partition structure of AV1.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[Coding Block Partition in VP9 and AV1]

With reference to partition structures (502)-(508) of FIGS. 5A-D, VP9 uses a 4-way partition tree starting from the 64×64 level down to 4×4 level, with some additional restrictions for blocks 8×8. Note that partitions designated as R in FIG. 5D refer to recursion in that the same partition tree is repeated at a lower scale until the lowest 4×4 level is reached.

With reference to partition structures (511)-(520) of FIGS. 6A-J, AV1 not only expands the partition-tree to a 10-way structure, but also increases the largest size (referred to as superblock in VP9/AV1 parlance) to start from 128×128. Note that this includes 4:1/1:4 rectangular partitions that did not exist in VP9. The partition types with 3 sub-partitions as shown in FIGS. 6C-F is called a "T-type" partition. None of the rectangular partitions may be further subdivided. In addition to coding block size, coding tree depth may be defined to indicate the splitting depth from the root note. To be specific, the coding tree depth for the root node, e.g. 128×128, is set to 0, and after tree block is further split once, the coding tree depth is increased by 1.

Instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 may be supported. For chroma blocks, only the largest possible transform units may be allowed.

[Block Partitioning in HEVC]

In HEVC, a coding tree unit (CTU) may be split into coding units (CUs) by using a quadtree (QT) structure denoted as a coding tree to adapt to various local characteristics. The decision on whether to code a picture area using inter-picture (temporal) or intra-picture (spatial) prediction may be made at the CU level. Each CU can be further split into one, two, or four prediction units (PUs) according to the PU splitting type. Inside one PU, the same prediction process may be applied and the relevant information is transmitted to the decoder on a PU basis. After obtaining the residual block by applying the prediction process based on the PU splitting type, a CU can be partitioned into transform units (TUs) according to another quad tree structure like the coding tree for the CU. One of key features of the HEVC structure is that it has the multiple partition concepts including CU, PU, and TU. In HEVC, a CU or a TU can only have a square shape, while a PU may have a square or rectangular shape for an inter predicted block. In HEVC, one coding block may be further split into four square sub-blocks, and transform is performed on each sub-block (i.e. TU). Each TU can be further split recursively (using quadtree split) into smaller TUs, which is called a Residual Quad-Tree (RQT).

At picture boundary, HEVC employs implicit quad-tree split so that a block will keep quad-tree splitting until the size fits the picture boundary.

[Quadtree with Nested Multi-Type Tree Coding Block Structure in VVC]

Figure 7A:
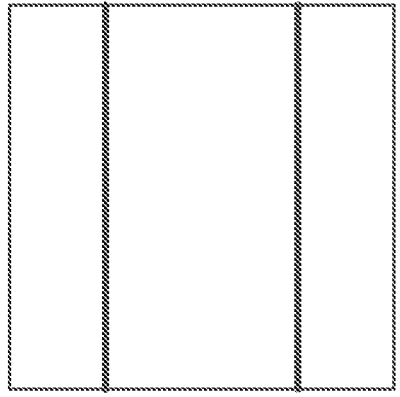
FIG. 7A is a diagram for demonstrating vertical binary splitting type in a multi-type tree structure.
Figure 7B:
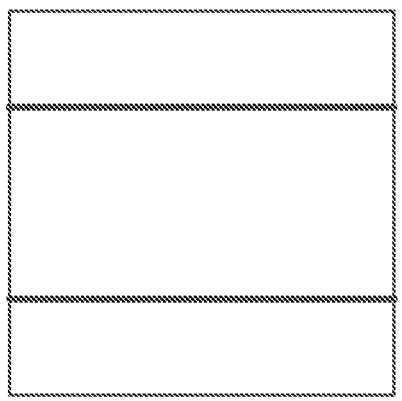
FIG. 7B is a diagram for demonstrating horizontal binary splitting type in a multi-type tree structure.
Figure 7C:
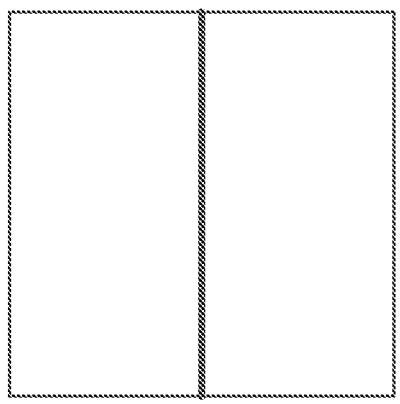
FIG. 7C is a diagram for demonstrating vertical ternary splitting type in a multi-type tree structure.
Figure 7D:
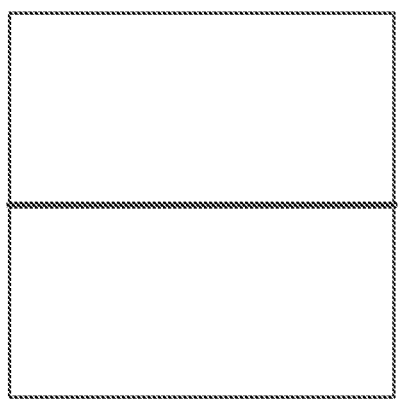
FIG. 7D is a diagram for demonstrating horizontal ternary splitting type in a multi-type tree structure.
Figure 8:
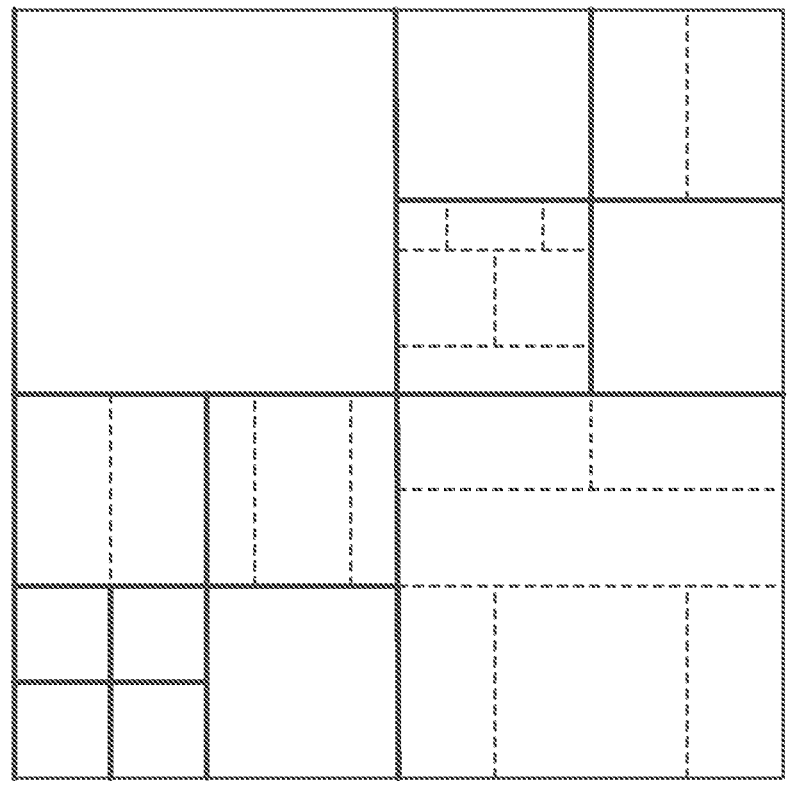
FIG. 8 is a diagram illustrating an example of a CTU divided into multiple CUs with a quad tree and nested multi-type tree coding block structure.

In VVC, a quadtree with nested multi-type tree using binary and ternary splits segmentation structure replaces the concepts of multiple partition unit types. That is, VVC does not include the separation of the CU, PU, and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quad tree) structure. Then, the quaternary tree leaf nodes can be further partitioned by a multi-type tree structure. As shown in diagrams (532), (534), (536), and (538) of FIGS. 7A-D, there are four splitting types in multi-type tree structure: vertical binary splitting (SPLIT_BT_VER) as illustrated in FIG. 7A, horizontal binary splitting (SP- LIT_BT_HOR) as illustrated in FIG. 7B, vertical ternary splitting (SPLIT_TT_VER) as illustrated in FIG. 7C, and horizontal ternary splitting (SPLIT_TT_HOR) as illustrated in FIG. 7D. The multi-type tree leaf nodes may be called coding units (CUs), and unless the CU is too large for the maximum transform length, this segmentation may be used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU. One example of block partition for one CTU is shown in FIG. 8. FIG. 8 shows a CTU (540) divided into multiple CUs with a quadtree and nested multi-type tree coding block structure, where the bold line edges represent quadtree partitioning and the broken line edges represent multi-type tree partitioning. The quadtree with nested multi-type tree partition provides a content-adaptive coding tree structure comprised of CUs.

In VVC, the maximum supported luma transform size is 64×64 and the maximum supported chroma transform size is 32×32. When the width or height of the CB is larger than the maximum transform width or height, the CB may be automatically split in the horizontal and/or vertical direction to meet the transform size restriction in that direction.

In VTM7, the coding tree scheme supports the ability for the luma and chroma to have a separate block tree structure. For P and B slices, the luma and chroma CTBs in one CTU may have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice may consist of coding blocks of all three colour components unless the video is monochrome.

[Directional Intra Prediction in AV1]

Figure 9:
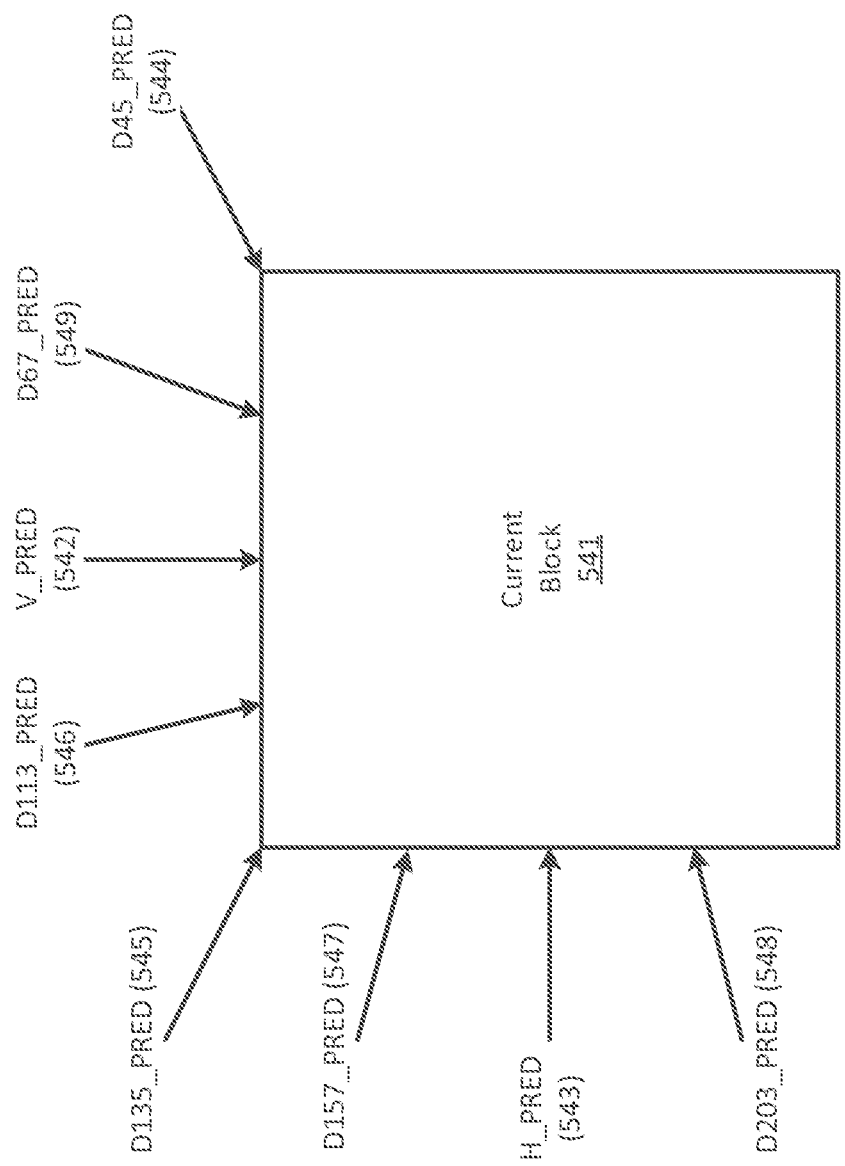
FIG. 9 is a diagram illustrating eight nominal angles in AV1.

VP9 supports eight directional modes corresponding to angles from 45 to 207 degrees. To exploit more varieties of spatial redundancy in directional textures, in AV1, directional intra modes are extended to an angle set with finer granularity. The original eight angles are slightly changed and made as nominal angles, and these 8 nominal angles are named as V_PRED (542), H_PRED (543), D45_PRED (544), D135_PRED (545), D113_PRED (546), D157_PRED (547), D203_PRED (548), and D67_PRED (549), which are illustrated in FIG. 9 with respect to a current block (541). The nominal angles may also be referred to as the base directional modes supported by the coding standard. For each nominal angle, there are seven finer angles, so AV1 has 56 directional angles in total. The prediction angle is presented by a nominal intra angle plus a delta angle, which is −3~3 multiples of the step size of 3 degrees. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

[Non-Directional Smooth Intra Predictors in AV1]

Figure 10:
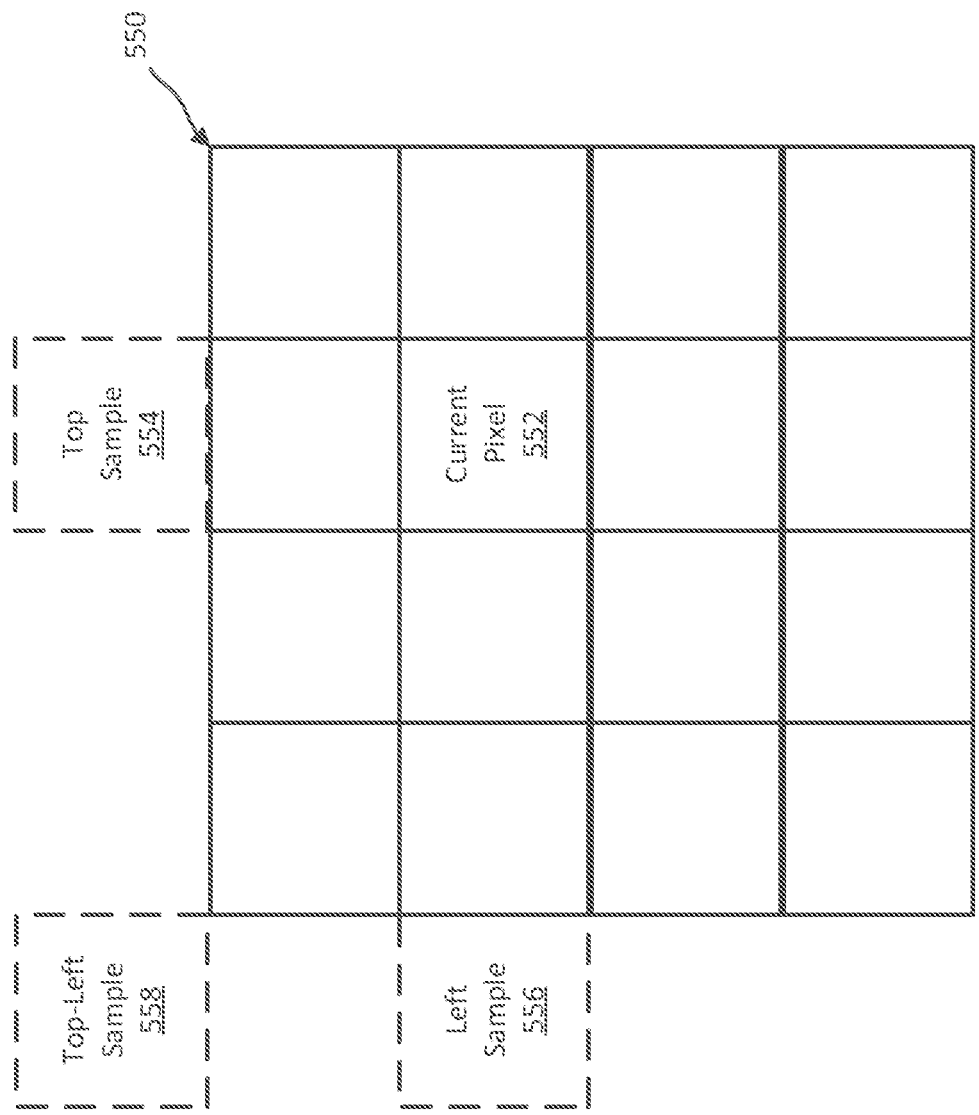
FIG. 10 is a diagram illustrating a current block and samples.

In AV1, there are five non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left, and top-left reference samples are firstly fetched, and then the value which is closest to (top+left−topleft) is set as the predictor for the pixel to be predicted. FIG. 10 illustrates the positions of a top sample (554), a left sample (556), and a top-left sample (558) for a current pixel (552) in a current block (550). For SMOOTH, SMOOTH_V, and SMOOTH_H modes, the current block (550) is predicted using quadratic interpolation in vertical or horizontal directions, or the average of both directions.

[Chroma Predicted from Luma]

For chroma component, besides 56 directional modes and 5 non-directional mode, chroma from luma (CfL) is a chroma-only intra prediction mode, which models chroma pixels as a linear function of coincident reconstructed luma pixels. The CfL prediction may be expressed as shown below in Equation 1:

$$CfL(\alpha) = \alpha \times L_{AC} + DC \qquad \text{(Equation 1)}$$

wherein $L_{AC}$ denotes the AC contribution of the luma component, α denotes the parameter of the linear model, and DC denotes the DC contribution of the chroma component. To be specific, the reconstructed luma pixels are subsampled into the chroma resolution, and then the average value is subtracted to form the AC contribution. To approximate the chroma AC component from the AC contribution, instead of requiring the decoder to calculate the scaling parameters as in some background art, AV1 CfL determines the parameter α based on the original chroma pixels and signals them in the bitstream. This reduces decoder complexity and yields more precise predictions. As for the DC contribution of the chroma component, it may be computed using intra DC mode, which is sufficient for most chroma content and has mature fast implementations.

For the signaling of chroma intra prediction modes, eight nominal directional modes, 5 non-directional modes, and CfL mode may be firstly signaled. The context for signaling these modes may be dependent on the corresponding luma mode of the top-left position of a current block. Then, if the current chroma mode is a directional mode, one additional flag may be signaled to indicate the delta angle to the nominal angle.

In AV1, there are seven delta angles for each directional nominal mode, and all the seven delta angles are signaled/parsed regardless of the direction of the neighboring nominal modes, which is not optimal.

Embodiments of the present disclosure may solve the above problem and/or other problems.

Embodiments of the present disclosure may be used separately or combined in any order. Further, each embodiment (e.g. methods, encoders, and decoders) may be implemented by processing circuitry (e.g. one or more processors or one or more integrated circuits). In one example, the one or more processors execute a program that is stored in a non-transitory computer-readable medium.

In the present disclosure, when saying one directional intra prediction mode is close to another directional intra prediction mode, it means the absolute difference of prediction angles between these two modes is within a given threshold T. In one example, T may be set to 1 or 2.

According to one or more embodiments, instead of signaling/parsing the same number of delta angles for each nominal angle, the number of the signaled/parsed delta angles may depend on the direction of the current nominal angles and/or neighboring nominal angles.

According to embodiments, based on the nominal angle of the current block being the same as (or close to) the nominal angle of at least one of the neighboring blocks, all of the delta angles (e.g. 7 delta angles) allowed for this nominal angle is signaled/parsed. Otherwise, only a subset of the allowed delta angles is signaled/parsed for this nominal angle (e.g. 3 delta angles). The allowed delta angles refer to the delta angles which, when combined with a nominal angle, correspond to a prediction angle supported by a coding standard. In an embodiment, the subset of the allowed delta angles is predefined and fixed. In one example, the subset of the allowed delta angles is {-2, 0, 2}. In another example, the subset of the allowed delta angles is {-1, 0, 1}. In another embodiment, the subset of the allowed delta angles depends on an absolute difference of prediction angles between the nominal angles of the current block and the neighboring blocks. In one example, the size of the subset becomes smaller as the absolute difference of prediction angles between the current nominal angle and the neighboring nominal angle increases. In one example, when the nominal angle of current block is equal to that of one of the neighboring blocks, all delta angles (e.g. 7 delta angles) are signaled/parsed. Otherwise, when the nominal angle of current block is adjacent to that of one of the neighboring blocks, five delta angles, such as {-2, -1, 0, 1, 2}, are signaled/parsed. Otherwise, only three delta angles, such as {-2, 0, 2}, are signaled/parsed.

Figure 11:
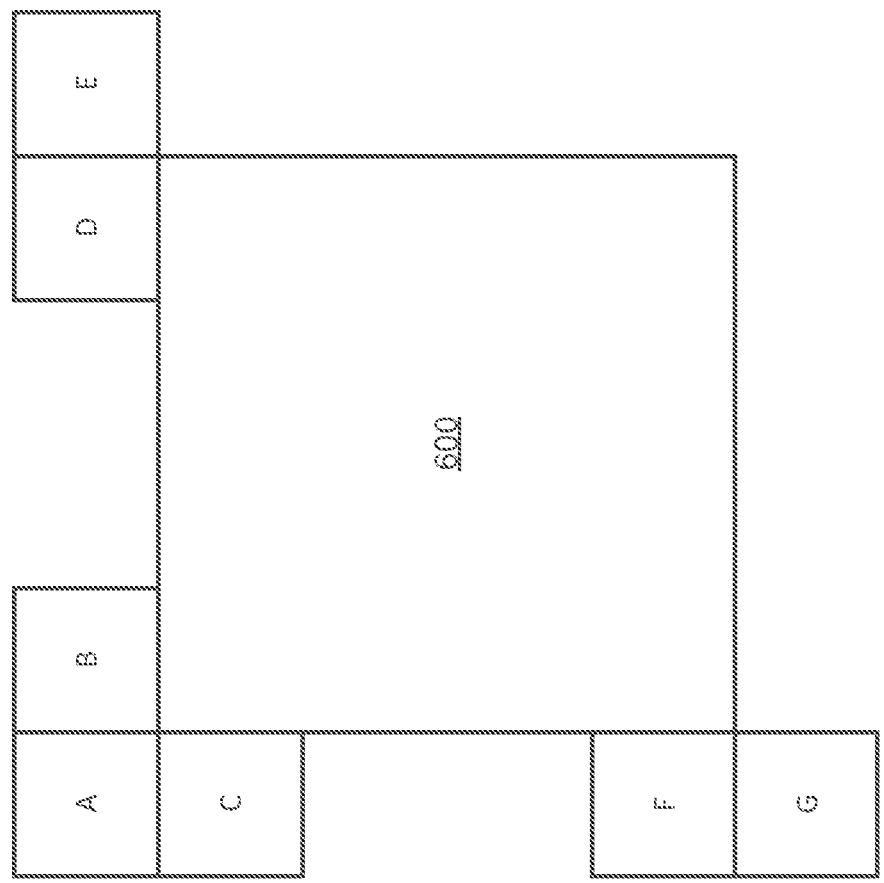
FIG. 11 is a diagram illustrating an example of positions of neighboring blocks of a current block, according to an embodiment of the present disclosure.

According to embodiment, the positions of the neighboring blocks are fixed and predefined, and up to N neighboring blocks are employed, wherein N is a positive integer, such as 7. One example of the positions of the neighboring blocks of a current block (600) is illustrated in FIG. 11. In an embodiment, only a subset of the neighboring blocks at seven positions may be used. In one example, only neighboring blocks at positions A, B, C, D, and F may be employed. In another example, only neighboring blocks at position A, B, C, D, E, and F may be employed. In another example, only neighboring blocks at position B, C, D, and F may be employed.

According to one or more embodiments, the context, or cumulative density function (CDF) used for signaling the delta angle of luma block may be based on the nominal angle of neighboring blocks. According to embodiments, the context (or CDF), used for signaling the delta angle of the luma block is dependent on both the nominal angle of the current luma block and the neighboring luma blocks. In an embodiment, when the nominal angle of the luma block is equal to one of the nominal angles of the neighboring luma blocks (or close within a given threshold), one or more contexts (or CDF) are used to signal the delta angle of the luma block. Otherwise, another or multiple different contexts (or CDF) may be used to signal the delta angle of the chroma block. In an embodiment, the positions of the neighboring blocks, as discussed with reference to FIG. 11, may be implemented.

According to one or more embodiments, instead of directly signaling the delta angle of the current luma block, the delta angle may be mapped to an associated index, and the index may be signaled. According to embodiments, the delta angle may be mapped to an associated index according to a predefined mapping table. According to embodiments, when the nominal angle of the luma block is equal to one of the nominal angles of the neighboring luma blocks (or close within a given threshold), the delta angle may be mapped to an index, and the index may be signaled. According to embodiments, the mapping from delta angle to the associated index may depend on the delta angles of the current luma block and the neighboring luma block.

Two examples of predefined mapping tables are shown below in TABLE 1 and TABLE 2, wherein the values in the first column denote the delta angles of the neighboring luma block, the values in the first row denote the associated index of delta angle for the current luma block, and the values in the remaining entries denote the delta angle of the current luma block. As an example with reference to TABLE 1, when the delta angle of a neighboring luma block is -9 and the delta angle of the current luma block is -9, the associated index is 0. As another example with reference to TABLE 1, when the delta angle of neighboring luma block is -3 and the delta angle of current luma block is -9, the associated index is 3.

TABLE 1

Example #1 of a mapping table

|    | 0  | 1  | 2  | 3  | 4  | 5  | 6  |
|----|----|----|----|----|----|----|----|
| -9 | -9 | -6 | -3 | 0  | 3  | 6  | 9  |
| -6 | -6 | -9 | -3 | 0  | 3  | 6  | 9  |
| -3 | -3 | -6 | 0  | -9 | 3  | 6  | 9  |
| 0  | 0  | -3 | 3  | -6 | 6  | -9 | 9  |
| 3  | 3  | 0  | 6  | -3 | 9  | -6 | -9 |
| 6  | 6  | 3  | 9  | 0  | -3 | -6 | -9 |
| 9  | 9  | 6  | 3  | 0  | -3 | -6 | -9 |

TABLE 2

Example #2 of a mapping table

|    | 0  | 1  | 2  | 3  | 4  | 5  | 6  |
|----|----|----|----|----|----|----|----|
| -9 | -9 | -6 | -3 | 0  | 3  | 6  | 9  |
| -6 | -6 | -3 | -9 | 0  | 3  | 6  | 9  |
| -3 | -3 | 0  | -6 | 3  | -9 | 6  | 9  |
| 0  | 0  | 3  | -3 | 6  | -6 | 9  | -9 |
| 3  | 3  | 6  | 0  | 9  | -3 | -6 | -9 |
| 6  | 6  | 9  | 3  | 0  | -3 | -6 | -9 |
| 9  | 9  | 6  | 3  | 0  | -3 | -6 | -9 |

Figure 12:
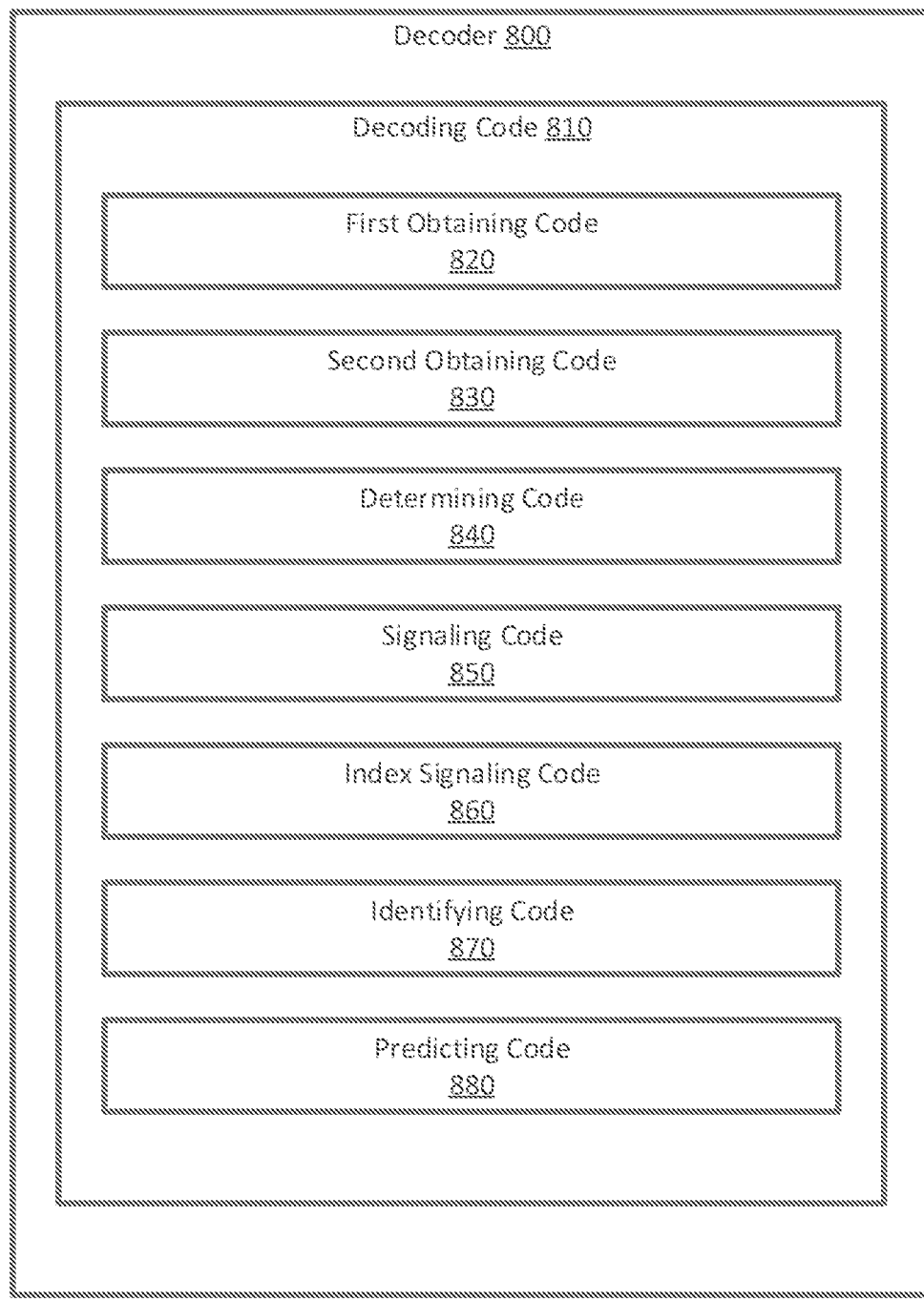
FIG. 12 is a schematic diagram of a decoder according to an embodiment of the present disclosure.

According to embodiments, at least one processor and memory storing computer program instructions may be provided. The computer program instructions, when executed by the at least one processor, may implement an encoder or a decoder and may perform any number of the functions described in the present disclosure. For example, with reference to FIG. 12, the at least one processor may implement a decoder (800). The computer program instructions may include, for example, decoding code (810) that is configured to cause the at least one processor to decode a coded picture that is received (e.g. from an encoder). The decoding code (810) may include, for example, first obtaining code (820), second obtaining code (830), determining code (840), signaling code (850); index signaling code (860), identifying code (870), and/or predicting code (880).

The first obtaining code (820) may be configured to cause the at least one processor to obtain a nominal angle of a current block of the coded picture for intra prediction, according to embodiments of the present disclosure.

The second obtaining code (830) may be configured to cause the at least one processor to obtain a nominal angle of at least one neighboring block of the current block for intra prediction, according to embodiments of the present disclosure.

The determining code (840) may be configured to cause the at least one processor to determine whether to signal all allowed delta angles of the nominal angle of the current block, or only a subset of the allowed delta angles of the nominal angle of the current block, based on a comparison between the nominal angle of the current block and the nominal angle of the at least one neighboring block, according to embodiments of the present disclosure.

The signaling code (850) may be configured to cause the at least one processor to signal all the allowed delta angles or the subset of the allowed delta angles of the nominal angle of the current block based on the determining, according to embodiments of the present disclosure.

The index signaling code (860) may be configured to cause the at least one processor to signal an index, according to embodiments of the present disclosure.

The identifying code (870) may be configured to cause the at least one processor to identify a delta angle of the current block by using a mapping table in which the index is mapped to the delta angle of the current block, according to embodiments of the present disclosure.

The predicting code (880) may be configured to cause the at least one processor to predict the current block, according to embodiments of the present disclosure.

According to embodiments, the encoder-side processes corresponding to the above processes may be implemented by encoding code for encoding a picture as would be understood by a person of ordinary skill in the art, based on the above descriptions.

The techniques of embodiments of the present disclosure described above, can be implemented as computer software using computer-readable instructions and physically stored in one or more computer-readable media. For example, FIG. 13 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 13 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method performed by at least one processor, the method comprising:
    decoding a bitstream that includes a picture, the decoding comprising:
        determining a nominal angle of a current block of the picture for intra prediction, wherein the nominal angle of the current block is a base directional mode for intra prediction of the current block;
        determining a nominal angle of at least one neighboring block of the current block for intra prediction, wherein the nominal angle of the at least one neighboring block is a base directional mode for intra prediction of the at least one neighboring block; and
        determining whether all allowed delta angles of the nominal angle of the current block are signalled or only a subset of the allowed delta angles of the nominal angle of the current block are signalled, based on a comparison between the nominal angle of the current block and the nominal angle of the at least one neighboring block; and
        decoding the bitstream based on whether the all allowed delta angles of the nominal angle of the current block are signalled are signalled or only the subset of the allowed delta angles of the nominal angle of the current block are signalled.

2. The method of claim 1, wherein
determining whether all the allowed delta angles of the nominal angle of the current block are signalled is based on an absolute difference between a value corresponding to the nominal angle of the current block and a value corresponding to the nominal angle of the at least one neighboring block being less than or equal to a threshold value.

3. The method of claim 2, wherein the threshold value is 2.

4. The method of claim 1, wherein
determining whether only the subset of the allowed delta angles of the nominal angle of the current block are signalled is based on an absolute difference between a value corresponding to the nominal angle of the current block and a value corresponding to the nominal angle of the at least one neighboring block being greater than a threshold value.

5. The method of claim 4, wherein a number of the allowed delta angles in the subset is based on the absolute difference between the value corresponding to the nominal angle of the current block and the value corresponding to the nominal angle of the at least one neighboring block.

6. The method of claim 1, wherein
the comparison is between the nominal angle of the current block and the nominal angle of only a predetermined number of neighboring blocks.

7. The method of claim 1, wherein
the determining of whether the all allowed delta angles of the nominal angle of the current block are signalled or only the subset of the allowed delta angles of the nominal angle of the current block are signalled is based on at least one of the allowed delta angles being signalled using a cumulative density function (CDF).

8. The method of claim 1, further comprises:
determining that an index is signalled within the bitstream based on a mapping table in which the index is mapped to a delta angle of the current block.

9. The method of claim 8, wherein
the index is mapped, in the mapping table, to the delta angle of the current block and a delta angle of the at least one neighboring block.

10. The method of claim 1, wherein the current block is a luma block.

11. A system comprising:
at least one memory configured to store computer program code; and
at least one processor configured to access the computer program code and operate as instructed by the computer program code, the computer program code comprising:
  decoding code configured to cause the at least one processor to decode a bitstream that includes a picture, the decoding code comprising:
  first determining code configured to cause the at least one processor to determine a nominal angle of a current block of the picture for intra prediction, wherein the nominal angle of the current block is a base directional mode for intra prediction of the current block;
  second determining code configured to cause the at least one processor to determine a nominal angle of at least one neighboring block of the current block for intra prediction, wherein the nominal angle of the at least one neighboring block is a base directional mode for intra prediction of the at least one neighboring block; and
  third determining code configured to cause the at least one processor to determine whether all allowed delta angles of the nominal angle of the current block are signalled or only a subset of the allowed delta angles of the nominal angle of the current block are signalled, based on a comparison between the nominal angle of the current block and the nominal angle of the at least one neighboring block; and
outputting code configured to cause the at least one processor to decode the bitstream based on whether the all allowed delta angles of the nominal angle of the current block are signalled are signalled or only the subset of the allowed delta angles of the nominal angle of the current block are signalled.

12. The system of claim 11, wherein
the third determining code is configured to cause the at least one processor to determine whether all the allowed delta angles of the nominal angle of the current block are signalled based on an absolute difference between a value corresponding to the nominal angle of the current block and a value corresponding to the nominal angle of the at least one neighboring block being less than or equal to a threshold value.

13. The system of claim 12, wherein the threshold value is 2.

14. The system of claim 11, wherein
the third determining code is configured to cause the at least one processor to determine whether only the subset of the allowed delta angles of the nominal angle of the current block are signalled based on an absolute difference between a value corresponding to the nominal angle of the current block and a value corresponding to the nominal angle of the at least one neighboring block being greater than a threshold value.

15. The system of claim 14, wherein a number of the allowed delta angles in the subset is based on the absolute difference between the value corresponding to the nominal angle of the current block and the value corresponding to the nominal angle of the at least one neighboring block.

16. The system of claim 11, wherein
the comparison is between the nominal angle of the current block and the nominal angle of only a predetermined number of neighboring blocks.

17. The system of claim 11, wherein
determining whether the all allowed delta angles of the nominal angle of the current block are signalled or only the subset of the allowed delta angles of the nominal angle of the current block are signalled is based on at least one of the allowed delta angles by using a cumulative density function (CDF).

18. The system of claim 11, wherein the decoding code further comprises:
index determining code that is configured to cause the at least one processor to determine that an index is signalled based on a mapping table in which the index is mapped to a delta angle of the current block.

19. The system of claim 18, wherein
the index is mapped, in the mapping table, to the delta angle of the current block and a delta angle of the at least one neighboring block.

20. A non-transitory computer-readable medium storing computer instructions that are configured to, when executed by at least one processor, cause the at least one processor to:
determine a nominal angle of a current block of the picture for intra prediction, wherein the nominal angle of the current block is a base directional mode for intra prediction of the current block;
determine a nominal angle of at least one neighboring block of the current block for intra prediction, wherein the nominal angle of the at least one neighboring block is a base directional mode for intra prediction of the at least one neighboring block;
determine whether all allowed delta angles of the nominal angle of the current block are signalled or only a subset of the allowed delta angles of the nominal angle of the current block are signalled, based on a comparison between the nominal angle of the current block and the nominal angle of the at least one neighboring block; and
decode the bitstream based on whether the all allowed delta angles of the nominal angle of the current block are signalled are signalled or only the subset of the allowed delta angles of the nominal angle of the current block are signalled.

* * * * *